United States Patent
Haddad

(10) Patent No.: US 10,257,697 B2
(45) Date of Patent: Apr. 9, 2019

(54) SYSTEMS AND METHODS FOR PRODUCT ACTIVATION

(71) Applicant: Ztar Mobile, Inc., Colleyville, TX (US)

(72) Inventor: Kevin Haddad, Colleyville, TX (US)

(73) Assignee: Ztar Mobile, Inc., Colleyville, TX (US)

( * ) Notice: Subject to any disclaimer, the term of this patent is extended or adjusted under 35 U.S.C. 154(b) by 0 days.

(21) Appl. No.: 14/803,657

(22) Filed: Jul. 20, 2015

(65) Prior Publication Data

US 2016/0150401 A1 May 26, 2016

Related U.S. Application Data

(63) Continuation of application No. 13/117,137, filed on May 27, 2011, now Pat. No. 9,087,305.

(51) Int. Cl.
| | |
|---|---|
| *G06K 19/06* | (2006.01) |
| *H04M 17/00* | (2006.01) |
| *G06K 7/00* | (2006.01) |
| *G06K 5/00* | (2006.01) |
| *H04M 15/00* | (2006.01) |
| *H04W 8/24* | (2009.01) |
| *G06K 19/077* | (2006.01) |
| *G06Q 20/34* | (2012.01) |
| *G06Q 10/00* | (2012.01) |
| *G06Q 20/20* | (2012.01) |
| *A45C 11/18* | (2006.01) |

(52) U.S. Cl.
CPC ...... *H04W 8/245* (2013.01); *G06K 19/06187* (2013.01); *G06K 19/06196* (2013.01); *G06K 19/07739* (2013.01); *G06Q 10/00* (2013.01); *G06Q 20/208* (2013.01); *G06Q 20/354* (2013.01); *H04M 15/7556* (2013.01); *H04M 17/103* (2013.01); *A45C 2011/188* (2013.01); *H04M 2215/7231* (2013.01)

(58) Field of Classification Search
CPC .............. G06Q 20/354; A45C 11/182; A45C 2011/186; A45C 2011/188
USPC ...... 235/493, 487, 375, 380; 705/35, 39, 44, 705/16–18
See application file for complete search history.

(56) References Cited

U.S. PATENT DOCUMENTS

| | | | | |
|---|---|---|---|---|
| 7,717,347 | B2 * | 5/2010 | Boyd | B42D 15/042 206/308.1 |
| 7,896,252 | B2 * | 3/2011 | Narlinger | B42D 15/02 235/487 |
| 2002/0185543 | A1 * | 12/2002 | Pentz | G06K 13/063 235/493 |

(Continued)

*Primary Examiner* — Suezu Ellis
(74) *Attorney, Agent, or Firm* — Cesari & Reed LLP; Kirk A. Cesari

(57) ABSTRACT

The disclosure is related to systems and methods of smart packaging. In one example, a package can include an embedded data storage element that is readable at a point-of-sale terminal and includes custom data stored on the data storage element. The custom data may be associated with a specific product related to the package, such as a SIM card or phone. The custom data can include information to allow a process related to the product to be performed. The process may include allowing activation of the product only when an indicator at a server indicates the package was processed at an authorized terminal.

19 Claims, 5 Drawing Sheets

(56) References Cited

U.S. PATENT DOCUMENTS

| | | | |
|---|---|---|---|
| 2004/0169088 A1* | 9/2004 | Nelms | A45C 11/182 |
| | | | 235/493 |
| 2005/0242193 A1* | 11/2005 | Smith | G07F 7/086 |
| | | | 235/487 |
| 2006/0023856 A1* | 2/2006 | Welton | G06Q 20/28 |
| | | | 379/114.2 |
| 2006/0161490 A1* | 7/2006 | Chakiris | G06Q 20/20 |
| | | | 705/35 |
| 2007/0043682 A1* | 2/2007 | Drapkin | G06Q 30/06 |
| | | | 705/71 |
| 2007/0187492 A1* | 8/2007 | Graves | G06Q 20/28 |
| | | | 235/380 |
| 2009/0061839 A1* | 3/2009 | Zimmerman | H04W 8/265 |
| | | | 455/419 |
| 2009/0063292 A1* | 3/2009 | Cole | G06Q 30/02 |
| | | | 705/26.81 |
| 2009/0218392 A1* | 9/2009 | Biskupski | B65D 73/0014 |
| | | | 235/375 |

* cited by examiner

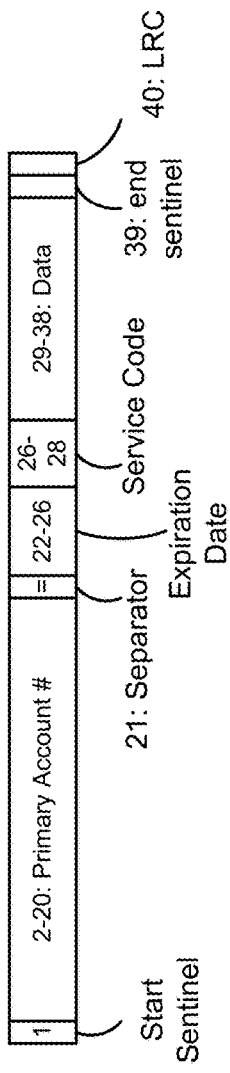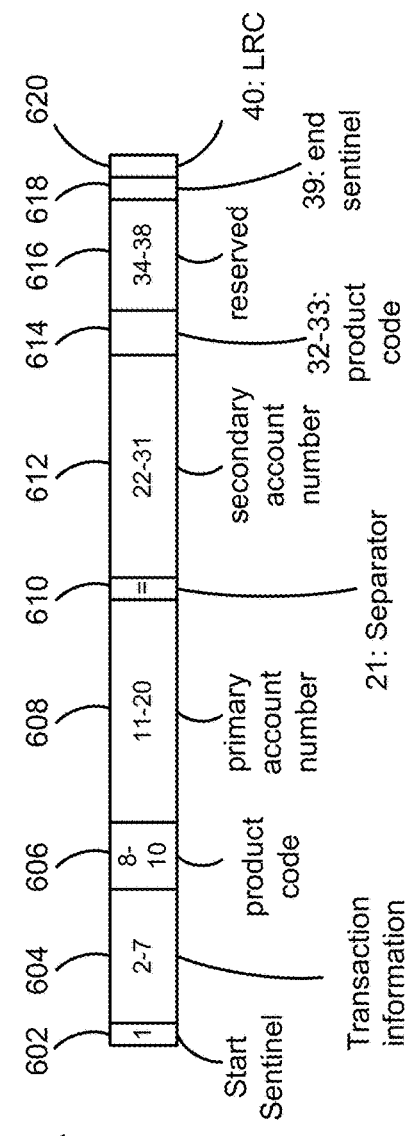

SYSTEMS AND METHODS FOR PRODUCT ACTIVATION

BACKGROUND

The present disclosure is generally related to systems and methods for smart packaging.

Devices such as cellular phones and phone calling cards can be bought at many retail locations. To use many of these devices, the device must be activated via a time consuming activation process. The activation process usually involves a user manually inputting a lengthy activation number or additional hardware such as a barcode scanner at the retail location specifically adapted for the activation process. Thus, the activation process at the retail location can be time consuming and expensive. The systems and methods described herein present solutions to at least these problems.

BRIEF DESCRIPTION OF THE DRAWINGS

FIG. 5 is a diagram of a prior art system of a magnetic stripe; and

FIG. 6 is a diagram of an illustrative embodiment of a magnetic stripe for smart packaging.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
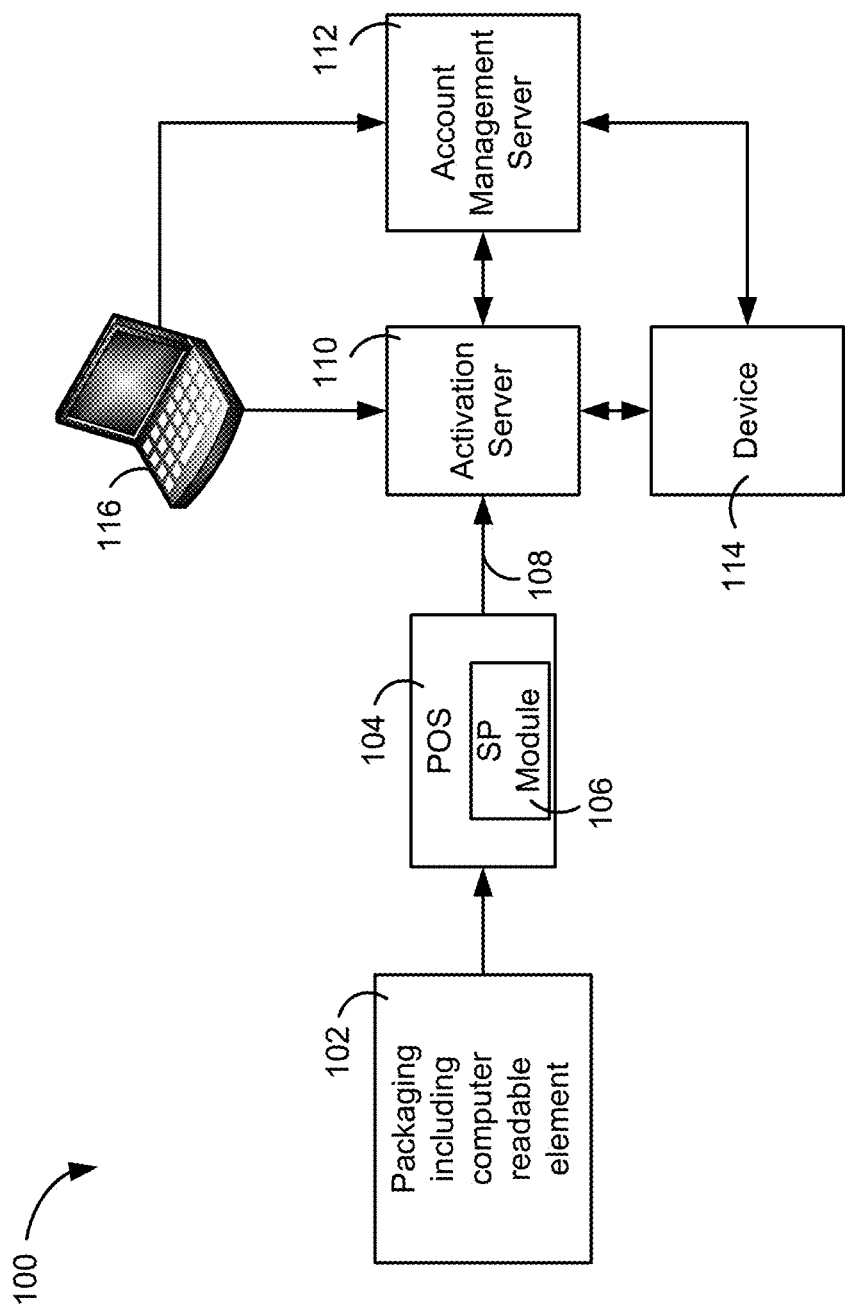
FIG. 1 is a diagram of an illustrative embodiment of a system of smart packaging.

Referring to FIG. 1, a particular embodiment of a system of smart packaging is shown and generally designated 100. The system 100 includes a packaging 102 that can have a computer readable element (not shown), such as a magnetic stripe. Other computer readable elements could include a radio-frequency-ID (RFID), chip identification, or a barcode. The packaging 102 may be for an electronic device that needs to be activated like a mobile phone, a subscriber identity module (SIM) card, a calling card, a gift card, a credit card, or any other type of product that could be associated with an account. In some embodiments, the packaging 102 may include the device to be activated or, in other embodiments, the package 102 may not include a device other than the packaging itself. For example, the packaging 102 may include a SIM card for use in a mobile phone, may include an account recharge card that can be applied to an already active account, or may just include the packaging 102 itself, where a certain amount of credit for an account can be purchased.

The system 100 may also include a point-of-sale (POS) system 104 that can include a smart packaging module 106. In one embodiment, the smart packaging module 106 comprises software that can be executed by an operating system of the POS system 104 and can implement the functions described herein without having any additional or specialized hardware added to the POS system 104. However, the smart packaging module 106 can be implemented by other embodiments that include hardware, software, or any combination thereof.

For example, the packaging 102 can include a magnetic stripe (not shown), such as a magnetic stripe in accordance with the TRACK 2 standard for financial transactions, defined by ISO standards (ISO/IEC 7813). However, instead of the magnetic stripe holding financial information as defined in the standards, the magnetic stripe has a unique data format that can be based on information related to the contents of the packaging 102. For example, a data format for a magnetic stripe of packaging 102 is shown and described with respect to FIG. 6. When the magnetic stripe is read via a magnetic stripe reader of the POS system 104, the smart packaging module 106 can receive an activation code, account information, or other data from the magnetic stripe on the packaging 102.

The computer readable element, such as an electronic stripe or RFID or smartchip, may have a customized data format based on the product being sold or based on other factors, such as the vendor or retailer distributing the products. In an example using a magnetic strip, the magnetic strip may partially comply with any of the financial magnetic strip standards, such as Track 1, Track 2, or Track 3, but the data structure and data stored on the strip does not fully comply with the requirements of the associated standard and instead includes data related to the product associated with the packaging.

Once the smart packaging module 106 has received information from the computer readable element, the smart packaging module 106 may send at least part of the information to an activation server 110 via network 108. The activation server 110 may perform functions corresponding to a device or service associated with the package 102. For example, the activation server 110 may activate a device associated with the information from the package 102, determine an amount of credit for an account, indicate that the package 102 or device was purchased, perform other functions, or any combination thereof. The activation server 110 may also communicate with an account management server 112. The account management server 112 may associate credit, allotted time, or other information with an account related to the package 102. The account management server 112 and the activation server 110 may be a single computer or may be separate computers. Network 108 may be any type of network: wired, wireless, local area network, wide area network, intranet, internet, or any combination thereof.

The smart packaging module 106 may have an authentication ability, such as an authentication key or encrypted identification value, to authenticate itself to the activation server 110. The smart packaging module 106 may also have encrypted communication capabilities for data sent between the POS system 104 and the activation server 110, the account management server 112, or both.

Further, a user may communicate with the activation server 110, the account management server 112, or both, via a computer 116 or a device 114, such as a phone. The device 114 may be a device, such as a SIM card or phone, that is included with the packaging 102 and can be activated by processes described herein. If a POS system has the associated software or hardware, a retailer can assign an account number or phone number to the product being purchased at the time of purchase; in some embodiments, an activation process may also be executed such that the product or credit to an associated account is available upon purchase from the retailer without any further steps needed.

The embodiments described herein provide benefits over previous systems by allowing a manufacturer or retailer to include electronically readable information on a package that allows functions related to the package to be performed, such as indicating a purchase or activation, without adding additional hardware to a POS system. However, such functions are not limited to only activation processes, the processes may be any process associated with an account or a product being purchased. Further embodiments described herein allow for a magnetic stripe to include information corresponding to a product to be read using a standardized magnetic stripe reader even though the magnetic strip does not completely comply with the standard associated with the magnetic stripe reader.

Figure 2:
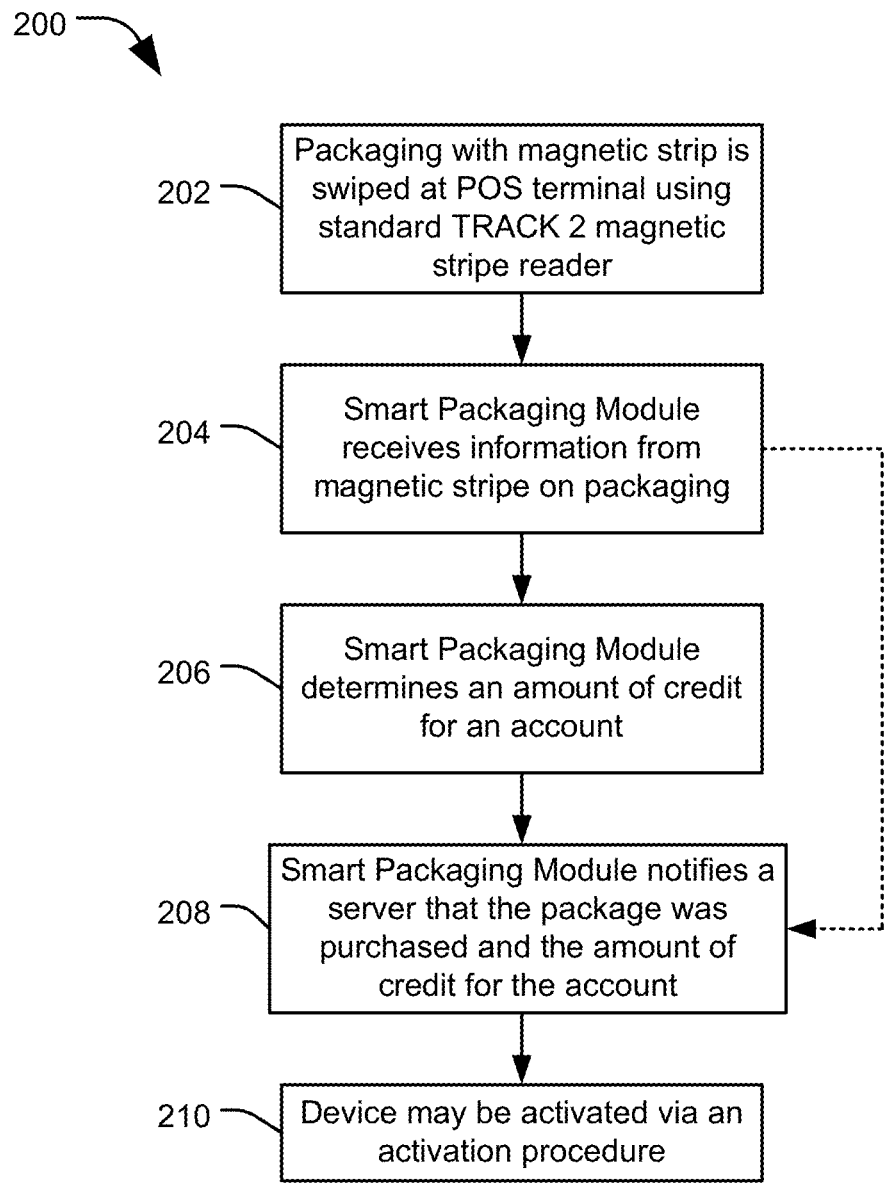
FIG. 2 is a flowchart of an illustrative embodiment of a method for smart packaging.

Referring to FIG. 2, an illustrative embodiment of a method for smart packaging is shown and generally designated 200. The method can include a packaging with an embedded data storage element, such as a magnetic stripe, being read at a POS terminal, at 202. In one example, a magnetic stripe is read using a Track 2 magnetic stripe reader even though the magnetic stripe does not completely comply with the Track 2 ISO standard.

To aid method 200, a smart packaging module, mostly consisting of software, can be installed to run on the POS terminal. The smart packaging module can receive information from the magnetic stripe on the packaging when it is read, at 204. Based on the type of product or service the packaging is associated with, the smart packaging module can determine an amount of credit to associate with an account, at 206. The amount of credit, which may be a dollar value or usage amount such as minutes, can be determined by a user input, information stored on the magnetic stripe, received from a database or server, stored within the smart packaging module, or by any other means. In other embodiments, an amount of credit may not be determined at the time of purchase, but can be added later by a user or another process.

In some embodiments, the smart packaging module may notify a server that the package was purchased, at 208. The smart packaging module may also notify the server of the amount of credit for the account, at 208. After the server is notified of the purchase, a device associated with the package may be activated, at 210. The device may be activated by an activation procedure, such as one of the activation procedures described herein.

Figure 3:
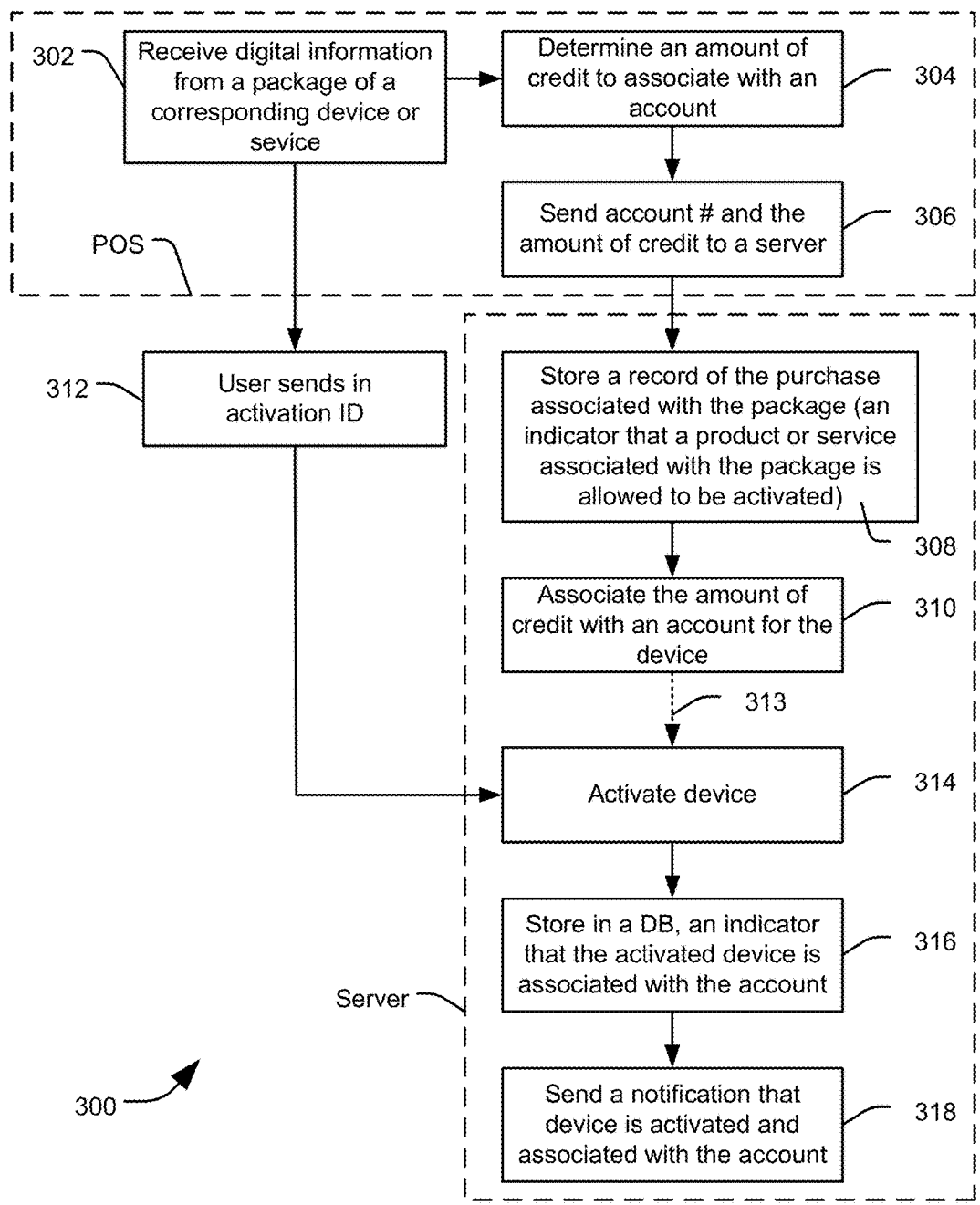
FIG. 3 is a flowchart of an illustrative embodiment of a method for smart packaging.

Referring to FIG. 3, an illustrative embodiment of a method for smart packaging is shown and generally designated 300. The method 300 may include receiving digital information from a package corresponding to a device or service, at 302. In one example, the device is a SIM card for use with a mobile device. The digital information may include one or more account numbers, an activation code, product code(s), other information, or any combination thereof. The digital information may be received by a POS system, such as POS system 104 shown in FIG. 1, without a need for customized hardware to be added to the POS system. For example, a magnetic stripe reader already at the POS system may be able to read and transmit the digital information to software within the POS system.

Optionally, the method 300 may include determining an amount of credit to associate with an account, at 304, which may be determined from the digital information, from a user input at the POS system, or by another process. The method 300 may send an account number and/or the amount of credit to associate with the account to a server, at 306. Parts 302, 304, and 306 of the method 300 may be performed at a POS terminal; however, it may be performed via any computer system connected to a network.

Once the server receives the account information, the server may store a record of the purchase associated with the package, at 308. The record may serve as an indicator that a device or service associated with the purchased package is allowed to be activated. The server may then associate the amount of credit to an account corresponding to the account information, at 310. In some embodiments, a device or service, such as a SIM card, is not activated until an activation ID is received. Thus, even though the account has been created and the credit has been credited to the account, it may not be useable until activation occurs. This type of double verification system to activate a product can reduce liabilities for a stolen package when there is no record that the package was purchased, which would prevent it from being activated.

A user or purchaser of the package may perform a process, such as via phone or computer, to activate the device or service associated with the package, at 312. Once the user or purchaser inputs an activation code, the server may activate the device, at 314. In another embodiment, the POS system may send an activation code to the server and the server could activate the device or service without input from a user, at 313. The POS system may receive the activation code from a magnetic stripe or it may be entered by a user.

The activation may be initiated by receiving an activation code, which may be included on the package. The activation code may be shorter than a device ID. For example, for SIM cards, which generally have a twenty (20) digit identification number, the activation code can be seven (7) digits. By shortening the activation code, the data input needed to activate is less and thus easier. Further, the shorter code can enable the activation code to be stored on a magnetic strip while still allowing space for other data to be stored. The server may translate the shorter activation code to a longer identification number and associate at least one of the activation code and the identification number to the account associated with the package.

In addition to storing an identification number, the server may store an indicator that the activation associated with a specific account has been completed, at 316. In one embodiment, one or more databases may store the information at the server. Further, in one example, a phone number or other account number associated with an account can be generated, associated with an account, and stored at the server.

Variations of the method 300 could be made and steps could be performed by other devices, at other times than indicated, or in a different order than indicated.

Figure 4:
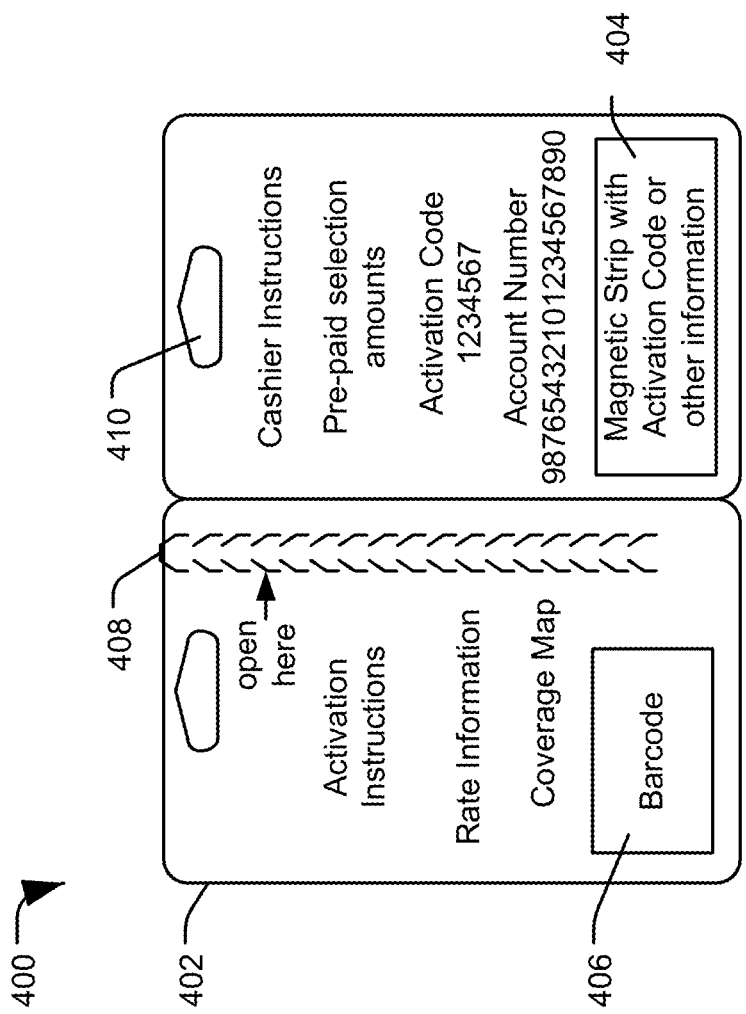
FIG. 4 is a diagram of an illustrative embodiment of a package of smart packaging.

Referring to FIG. 4, an illustrative embodiment of a package for smart packaging is shown and generally designated 400. The package 400 may be a package for a device (not shown), such as a SIM card, or may be separate from the device, such as a package to add pre-paid credits to an account. The package 400 may include a magnetic stripe 404, or other electronic data storage element, that can store information related to the product or service being purchased, such as account number(s), activation code, product code(s), a value of credit(s), or other information. In a particular embodiment, the magnetic stripe 404 complies with the requirements of the Track 2 reader standards to allow the magnetic stripe to be read by Track 2 capable magnetic stripe readers.

The package 400 may also include a barcode 406, an access point 408 to open the package 400, and a hanging element 410 to allow the package 400 to be displayed by hanging. Further, the package 400 may have product information printed on it, such as activation instructions, rate information, a coverage map, such as for cellular network service, cashier instructions, a pre-determined value of credits, an activation code, or an account number.

Referring to FIG. 5, a diagram of a prior art system of a magnetic stripe is shown and generally designated 500. Prior art magnetic stripes were designed in accordance with standards, such as the ISO standards, having specific data structures to enable specific functions, such as financial transactions. The magnetic stripe 500 is the layout for a magnetic stripe in complete compliance with the Track 2 type magnetic stripe standard.

Referring to FIG. 6, a diagram of an illustrative embodiment of a magnetic stripe for smart packaging is shown and generally designated 600. The magnetic stripe 600 may be constructed, e.g. size and bit density, to be able to be read by a Track 2 type magnetic stripe reader. However, the data structure and information contained in the magnetic stripe 600 can be information directly related to a product associated with the packaging on which the magnetic stripe is located. The data structure and information stored on the magnetic stripe 600 can be customized for different products associated with the packaging.

For example, one embodiment of the magnetic stripe 600 can include a start sentinel 602, a transaction routing number 604, a product code 606, a primary account number 608, a separator 610, a secondary account number 612, a product code 614, a reserved area 616, an end sentinel 618, and a Longitudinal Redundancy Check (LRC) 620. While the start sentinel, end sentinel, separator, and LRC coincide with the data structure placement according to the Track 2 ISO standard, the other data structures of the magnetic stripe 600 do not coincide with the data structures of the Track 2 ISO standards. Therefore, the data structure of the magnetic stripe 600 is not in completely in compliance with the Track 2 standard; however, a Track 2 type magnetic stripe reader is able to read the new magnetic stripe data structure.

Thus, the magnetic stripe 600 allows a customizable magnetic stripe to be included on the packaging of products. This can allow a retailer to sell packages that have the customizable magnetic stripe 600 and use the magnetic stripe 600 (for activation of products or service or for other uses) without having to add new hardware if they currently have a Track 2 type magnetic stripe reader. This can simplify an activation process, be used as a verification of purchase, and provide other benefits to the retailer and supplier of the packages.

In accordance with various embodiments, the methods described herein may be implemented as one or more software programs running on a computer processor or controller. Dedicated hardware implementations including, but not limited to, application specific integrated circuits, programmable gate arrays, and other hardware devices can likewise be constructed to implement the methods described herein. The systems and methods described herein can be applied to any type of computer system that could manage a smart packaging system.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   receiving, at a server, an account number from a data storage element of a package associated with a cellular phone related product, the data storage element including custom data related to the cellular phone related product,
   receiving, at the server, an activation code to activate the cellular phone related product, the activation code associated with a product identification number that is longer than the activation code, the custom data including the activation code;
   translating, via the server, the activation code to determine the product identification number;
   associating, via the server, an account related to the account number with an indicator to indicate the package was processed at an authorized terminal; and
   activating a cellular phone service identified by the product identification code.

2. The method of claim 1 further comprising associating an amount of credit to the account number.

3. The method of claim 1 further comprising allowing activation of the cellular phone related product only when the indicator at the server indicates the package was processed at an authorized terminal.

4. The method of claim 3 further comprising:
   associating the account with the activated product.

5. The method of claim 4 further comprising associating the product identification number with the account.

6. The method of claim 1 wherein the data storage element comprises a magnetic stripe having a data structure that is readable by a standardized magnetic stripe data reader, and the data structure is not completely in compliance with a standard associated with the standardized magnetic stripe data reader, and data stored in the data structure includes the account number and the activation code.

7. A computer system comprising:
   a server including a processor configured to:
      receive an account number from a data storage element of a package associated with a cellular phone related product, the data storage element including custom data related to the cellular phone related product;
      receive an activation code to activate the cellular phone related product, the activation code associated with a product identification number that is longer than the activation code, the custom data including the activation code;
      translate the activation code to determine the product identification number;

associate an account related to the account number with an indicator to indicate the package was processed at an authorized terminal; and activate a cellular phone service identified by the product identification code.

8. The computer system of claim 7 further comprising the processor configured to associate an amount of credit to the account number.

9. The computer system of claim 7 further comprising the processor configured to allow activation of the cellular phone related product only when the indicator at the server indicates the package was processed at an authorized terminal.

10. The computer system of claim 7 further comprising the cellular phone related product is a subscriber identity module (SIM) card which has a twenty digit a twenty (20) digit identification number and the activation code is seven (7) digits.

11. The computer system of claim 10 further comprising the processor configured to associate the product identification number with the account.

12. The computer system of claim 7 wherein the data storage element comprises a magnetic stripe having a data structure that is readable by a standardized magnetic stripe data reader, and the data structure is not completely in compliance with a standard associated with the standardized magnetic stripe data reader, and data stored in the data structure includes the account number and the activation code.

13. The computer system of claim 7 further comprising the processor configured to receive an authentication key to authenticate the package to the server.

14. A device comprising:
a server including a processor configured to:
receive an account number from a data storage element of a package associated with a cellular phone related product, the data storage element including custom data related to the cellular phone related product; and
associating an account related to the account number with an indicator to indicate the package was processed at an authorized terminal;
receive an activation code to activate the cellular phone related product, the activation code associated with a product identification number that is longer than the activation code;
translate the activation code to determine the product identification number and associate the product identification number with the account;
associate an account related to the account number with an indicator to indicate the package was processed at an authorized terminal; and
activate a cellular phone service identified by the product identification code.

15. The device of claim 14 further comprising the processor configured to allow activation of the cellular phone related product only when the indicator at the server indicates the package was processed at an authorized terminal.

16. The device of claim 15 wherein the data storage element comprises a magnetic stripe having a data structure that is readable by a standardized magnetic stripe data reader, and the data structure is not completely in compliance with a standard associated with the standardized magnetic stripe data reader, and data stored in the data structure includes the account number and the activation code.

17. The device of claim 14 further comprising the processor configured to associate the account with the activated product.

18. The device of claim 17 further comprising the processor configured to associate an amount of credit to the account number.

19. The device of claim 14 further comprising the processor configured to receive an authentication key to authenticate the package to the server.

* * * * *